US 6,429,976 B1

(12) United States Patent
Yamamoto et al.

(10) Patent No.: US 6,429,976 B1
(45) Date of Patent: Aug. 6, 2002

(54) OPTICAL SWITCH USING TILT MIRRORS

(75) Inventors: Tsuyoshi Yamamoto; Tamotsu Akashi; Kazuyuki Mori; Yuji Tochio; Kazuhiro Tanaka, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/812,827

(22) Filed: Mar. 21, 2001

(30) Foreign Application Priority Data

Nov. 29, 2000 (JP) ........................................ 2000-363262

(51) Int. Cl.⁷ .................... G02B 27/30; G02B 27/10; G02B 26/00
(52) U.S. Cl. ................... 359/641; 359/627; 359/290
(58) Field of Search ............................... 359/627, 641, 359/290, 291

(56) References Cited

U.S. PATENT DOCUMENTS 6,044,705 A    4/2000  Neukermans et al. .... 73/504.02
6,330,102 B1 * 12/2001 Daneman et al. .......... 359/290

FOREIGN PATENT DOCUMENTS

JP    WO/00/20899    4/2000

OTHER PUBLICATIONS

D.T. Neilson, et al. "Fully Provisioned 112×112 Micro–Mechanical Optical Crossconnect With 35.8Tb/s Demonstrated Capacity", Optical Fiber Communications Conference (OFC 2000) Post Deadline Paper PD–12, Mar. 2000.

* cited by examiner

Primary Examiner—Ricky Mack
(74) Attorney, Agent, or Firm—Staas & Halsey LLP

(57) ABSTRACT

The invention is aimed at providing an optical switch using tilt mirrors, in which easy mounting of the optical components is possible by simplifying the construction, and in which a short spatial propagation distance for the light beam is realized. To this end, the optical switch using tilt mirrors of the present invention comprises; a collimator array and a tilt mirror array each formed with an input section and an output section aligned and integrated, and a shift type turn-back mirror that shifts the optical path of the incident light in a predetermined direction and turns back and outputs this. The construction is such that the light input to the input section of the collimator array is reflected by the input section of the tilt mirror array so that the optical path is changed, and is then sent to the shift type turn-back mirror, and the light which has been shifted and turned back by the shift type turn-back mirror is reflected by the output section of the tilt mirror array and output from the output section of the collimator array.

11 Claims, 9 Drawing Sheets

OPTICAL SWITCH USING TILT MIRRORS

BACKGROUND OF THE INVENTION (1) Field of the Invention

The present invention relates optical switches applicable to various devices for optical communication. In particular the invention relates to optical switches of the spatially optical coupled type using a plurality of tilt mirrors each of which has a reflective surface with an angle thereof being controllable.

(2) Related Art

For example, as conventional optical switches applied to various optical communication devices such as optical cross-connection devices, constructions which mechanically switch an optical fiber, or which use a waveguide device are generally known. However, conventional optical switches of this construction are limited to a scale of only tens of channels, and to realize large scale optical switches extending to thousands of channels as required for recent years, it is necessary to introduce new technology.

As one technology for realizing large-scale optical switches, the development of optical switches of the spatially optical coupled type which use micro-tilt mirror arrays manufactured for example by applying the technology for micro machining (MEMS: Micro Electric Mechanical System), is progressing. More specifically, there are the optical switches known for example by an article by D. T. Neilson et al., "Fully provisioned 112×112 micromechanical optical cross-connect with 35.8 Tb/s demonstrated capacity," Optical Fiber Communications Conference (OFC 2000), Post deadline paper PD-12, March 2000, or by International Patent Publication WO 00/20899. Moreover, in relation to the micro tilt mirror by the MEMS, there is known the technology disclosed for example in the specification of U.S. Pat. No. 6,044,705.

The basic construction of optical switches using such conventional tilt mirrors, comprises for example, as shown in the perspective view of FIG. 13 and the plan view of FIG. 14, an input collimator array 51A, an output collimator array 51B and two MEMS tilt mirror arrays 52A and 52B. By switching an optical path by changing an angle of input light from the input collimator 51A by the first tilt mirror array 52A, and making the angle of beam return by the second tilt mirror array 52B, the light for which the optical path is switched is incident on the output collimator array 51B.

However, with an optical switch using the conventional tilt mirrors as described above, there has been a problem that high precision is required in mounting the input and output collimators 51A and 51B and the tilt mirror arrays 52A and 52B. As a technique for solving this problem, there is proposed a construction such as that shown in the perspective view of FIG. 15 and the plan view of FIG. 16 where by turning back input light with a mirror 53, and using a collimator array 51 and a tilt mirror array 52 with input sides and output sides formed integrally, respectively, a reduction in the members and adjustment parts is achieved.

However, in an optical switch constructed using a turn-back mirror 53 as shown in the aforementioned FIG. 15 and FIG. 16, because the input section and the output section of the tilt mirror array 52 are arranged on the same plane, then compared to the case of the construction shown in the aforementioned FIG. 13 and FIG. 14, for example when the swing angles of the input tilt mirrors are all set identically, the spatial propagation distance (the optical path length) of the beam in the switch is doubled. Therefore, there is a disadvantage that the optical switch increases in size. In order to reduce the optical path distance, for example, the swing angle of the input tilt mirror may be increased. However, there is a limit to a range of the controllable swing angle of the tilt mirror. Also with a tilt mirror having a large swing angle, since the constructional size becomes large, miniaturization of the overall optical switch is difficult.

SUMMARY OF THE INVENTION

The present invention has been achieved in view of the abovementioned points and has an object of providing an optical switch using tilt mirrors, in which easy mounting of optical components is possible by the simplification of construction, and in which a short spatial propagation distance for a light beam is realized.

In order to achieve the abovementioned object, the optical switch using tilt mirrors of the present invention comprises: a collimator array formed with an input section arranged with a plurality of input collimators and an output section arranged with a plurality of output collimators, the input section and the output section being aligned within the same plane; a tilt mirror array formed with an input section arranged with a plurality of input tilt mirrors each of which has a reflection surface with an angle thereof being controllable and an output section arranged with a plurality of output tilt mirrors each of which has a reflection surface with an angle thereof being controllable, the input section and the output section being aligned within the same plane; and a shift type turn-back mirror for shifting an optical path of incident light in a predetermined direction and turning back and outputting this light, wherein the light output from the respective input collimators of the collimator array, is reflected by the corresponding input tilt mirrors of the tilt mirror array so that the optical path is changed, and is then sent to the shift type turn-back mirror, and the light which has been shifted and turned back by the shift type turn-back mirror is reflected by the corresponding output tilt mirrors of the tilt mirror array and then respectively output from the respective output collimators of the collimator array.

With such a construction, after the propagation direction of the light reflected by the input section of the tilt mirror array has been shifted and turned back with the shift type turn-back mirror, the light is sent to the output section of the tilt mirror array. Hence, it is possible to realize a construction where the input and output sections of the collimator array and those of the tilt mirror array are integrated, respectively, without increasing the spatial propagation distance of the light inside the switch. As a result, it is possible to provide an optical switch using small size tilt mirrors with easy mounting for the optical components. Moreover, by reducing the number of optical components, it is also possible to improve stability against disturbances such as temperature fluctuations and vibrations.

Furthermore, for a specific construction of the abovementioned optical switch using tilt mirrors, the tilt mirror array is arranged so that a normal direction of a plane on which the respective reflection surfaces of the input tilt mirrors and the output tilt mirrors are arranged, and a propagation direction of the light output from the input section of the collimator array are not parallel. In particular, preferably the tilt mirror array is arranged so that an angle subtended by the normal direction and the propagation direction of the light from the collimator array is approximately 45°. By arranging in this manner, it is possible to minimize the distance between the input section and the output section of the tilt mirror array with respect to the swing angles of the respective tilt mirrors.

Further, with the optical switch using tilt mirrors as described above, the arrangement may be such that the direction in which the input section and the output section of the collimator array are aligned, the direction in which the input section and the output section of the tilt mirror array are aligned, and the shift direction of the optical path of the shift type turn-back mirror, are made parallel, respectively, with respect to a reference plane which contains the normal direction for the tilt mirror array and the propagation direction of the light output from the input section of the collimator array. Alternatively, the arrangement may be such that the respective directions are perpendicular to the reference plane. In this case, the spatial propagation distance of the light inside the switch can be made even shorter.

In addition, preferably in the aforementioned optical switch, the respective input tilt mirrors and the respective output tilt mirrors are micro tilt mirrors made applying micro machining technology. By using these micro tilt mirrors, it is possible to even further reduce the size of the optical switch and achieve multichannels.

Moreover, with the optical switch using tilt mirrors as described above, as a specific construction for the shift type turn-back mirror, this may have; a first reflecting surface for reflecting light from the input section of the tilt mirror array to shift the optical path, and a second reflecting surface for reflecting the light from the first reflecting surface to turn this back to the output section of the tilt mirror array. Preferably, an angle subtended by the first reflecting surface and the second reflecting surface is set to approximately 90°. By setting in this manner, the light beam is turned back in a direction parallel to the propagation direction of the incident light, enabling the design of the optical system to be easily performed.

Other objects, features and advantages of the present invention will become apparent from the following description of embodiments given in conjunction with the appended drawings.

DETAILED DESCRIPTION OF THE INVENTION

Hereunder is a description of embodiments of the present invention based on the drawings.

Figure 1:
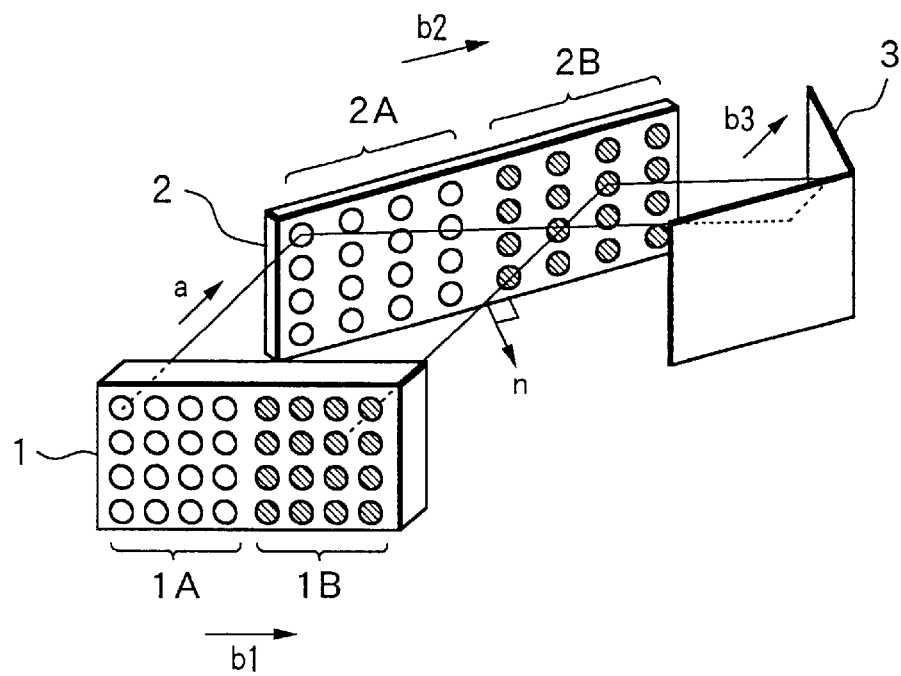
FIG. 1 is a perspective view of a first basic construction of an optical switch using tilt mirrors according to the present invention.

FIG. 1 is a perspective view showing a first basic construction of an optical switch using tilt mirrors of the present invention. Moreover, FIG. 2 is a plan view of the optical switch of FIG. 1.

Figure 2:
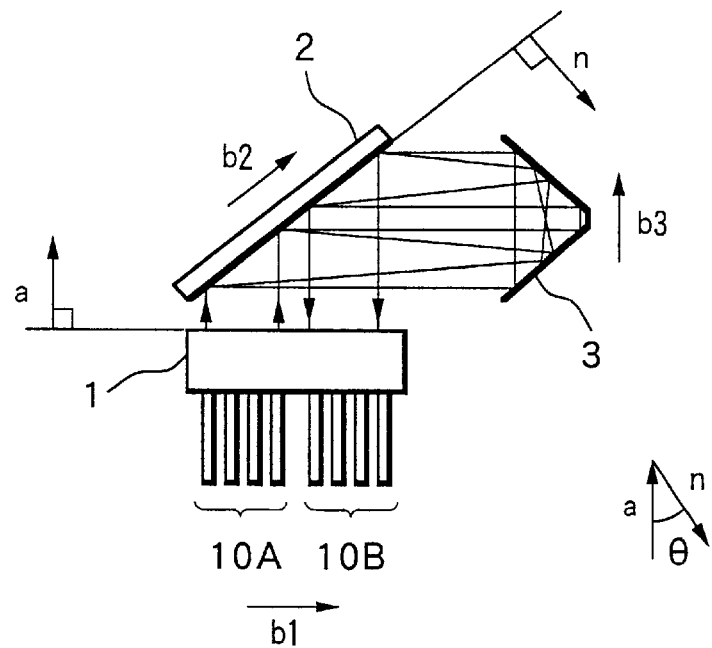
FIG. 2 is a plan view of the optical switch of FIG. 1.

In FIG. 1 and FIG. 2, this optical switch has a first basic construction comprising: an integrated input/output type collimator array 1 formed with an input section 1A and an output section 1B aligned on the same plane; an integrated input/output type tilt mirror array 2 formed with an input section 2A and an output section 2B aligned on the same plane; and a shift type turn-back mirror 3 for shifting an optical path of incident light in a predetermined direction and turning back and outputting this.

Regarding the input section 1A of the collimator array 1, a plurality of input collimators (shown as empty circles in FIG. 1) are arranged in two-dimensional. Moreover, for the output section 1B of the collimator array 1 also, a plurality of output collimators (shown as circles filled with diagonal lines in FIG. 1) are arranged in two-dimensional. As shown in FIG. 2, the input section 1A of the collimator array 1 is connected with an input optical fiber array 10A with a plurality of optical fibers arranged in two-dimensional corresponding to the respective input collimators. Light output from each of the input optical fibers passes through each of the collimators to become parallel light and is sent to the input section 2A of the tilt mirror array 2. Moreover, also the output section 1B of the collimator array 1 is connected with an output optical fiber array 10B with a plurality of optical fibers arranged in two-dimensional corresponding to the respective output collimators. Light reflected by the output section 2B of the tilt mirror array 2 passes through each of the collimators and is coupled to each of the output optical fibers. Here, the example is shown where the input collimator and the output collimator are each arranged as 4 horizontally×4 vertically. However, the arrangement of the input and output collimators in the present invention is not limited to this.

Regarding the input section 2A of the tilt mirror array 2, a plurality of input tilt mirrors (shown as empty circles in FIG. 1) are arranged in two-dimensional respectively corresponding to the input collimators of the collimator array 1. Moreover, with the output section 2B of the tilt mirror array 2 also, a plurality of output tilt mirrors (shown as circles filled with diagonal lines in FIG. 1) are arranged in two-dimensional respectively corresponding to the output collimators of the collimator array 1.

The tilt mirror array 2 is arranged so that a normal direction n on a plane on which the mirror surface of each tilt mirror is arranged, and a propagation direction (optical axis direction) a of input light sent from the collimator array 1, are not parallel to each other. Specifically, an angle θ (see bottom right of FIG. 2) subtended by the normal direction n of the tilt mirror 2 and the propagation direction a of the input light is preferably set to approximately 45°. By setting the angle θ to approximately 45°, it is possible to minimize a distance between the input section 2A and the output section 2B with respect to swing angles of the respective tilt mirrors.

Regarding the positioning of tilt mirror array 2 in the construction example of FIG. 1, an alignment direction b2 of the input section 2A and the output section 2B is set so as to be parallel to a reference plane (hereunder, n-a plane) which contains the aforementioned normal direction n of the tilt mirror 2 and the propagation direction a of the input light.

For the respective tilt mirrors on the input side and the output side, it is possible to use known micro tilt mirrors made applying, for example, micro machining (MEMS) technology. The MEMS micro tilt mirror is one where a movable plate formed with a mirror on an upper surface thereof and supported by torsion bars is integrally provided on a silicon substrate, and a swing angle of the mirror is variably controlled by rotating the movable plate by magnetic force with the torsion bars as an axis. Specifically, it is possible to use for example the technology disclosed in the specification of U.S. Pat. No. 6,044,705.

Figure 3A:
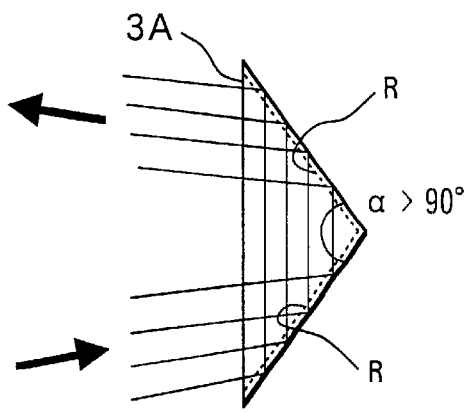
FIGS. 3A–3C are views of a triangular prism used as a shift type turn-back mirror in the optical switch using tilt mirrors of the present invention, FIG. 3A being for where the apex angle α>90°, FIG. 3B being for where the apex angle α=90°, and FIG. 3C being for where the apex angle α<90°.
Figure 3B:
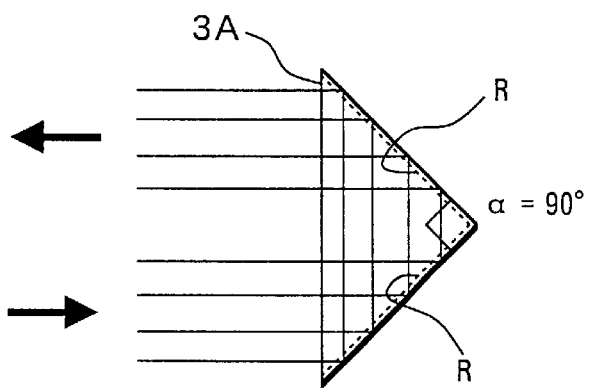
Figure 3C:
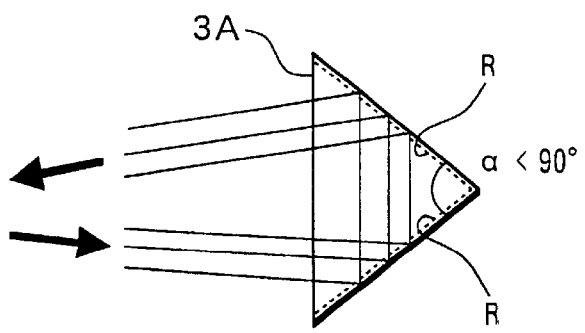
Figure 4A:
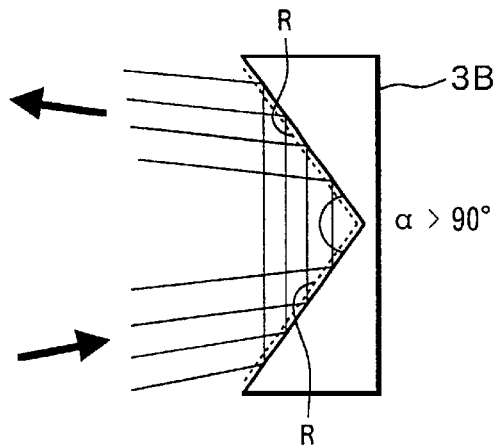
FIGS. 4A–4C are views of a V-shaped mirror used as a shift type turn-back mirror in the optical switch using tilt mirrors of the present invention, FIG. 4A being for where the apex angle α>90°, FIG. 4B being for where the apex angle α=90°, and FIG. 4C being for where the apex angle α<90°.
Figure 4B:
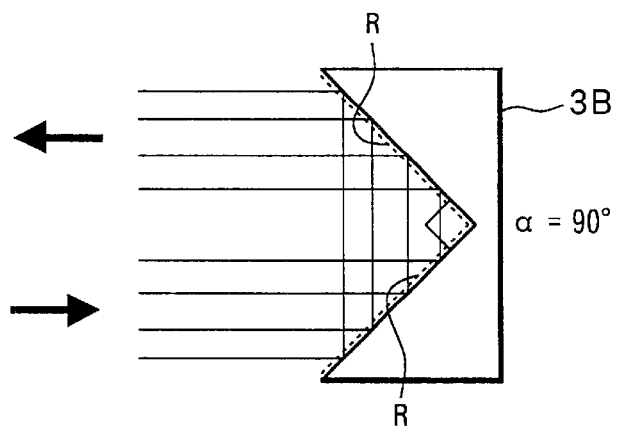
Figure 4C:
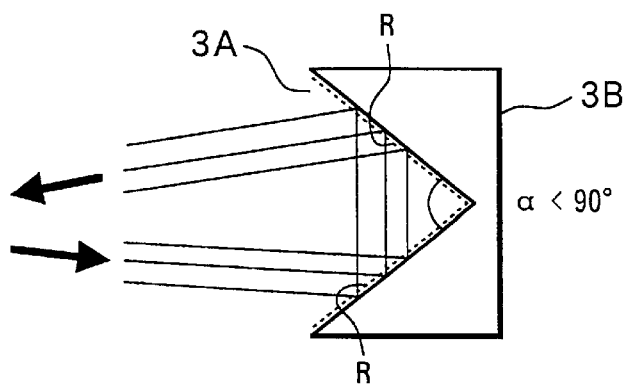

The shift type turn-back mirror 3 turns back the light from the input section 2A of the tilt mirror array 2 while shifting the light in a required direction, and sends this to the output section 2B of the tilt mirror array 2. In the construction example of FIG. 1, the shift type turn-back mirror 3 is positioned so that a shift direction b3 of the light beam is parallel to the n-a plain. As a specific example of the shift type turn-back mirror 3, as shown in FIG. 3, it is possible to use a triangular prism 3A with a reflective coating R applied to the required two surfaces, or as shown in FIG. 4, a V-shaped mirror 3B. An angle α (hereunder referred to as the apex angle α) of the two reflective surfaces of the shift type turn-back mirror 3 can be optionally set to match the construction and position of the tilt mirror array 2. FIG. 3A and FIG. 4A show the optical path when the apex angle α is set to an obtuse angle; FIG. 3B and FIG. 4B show the optical path when the apex angle α is set to 90°, and FIG. 3C and FIG. 4C show the optical path when the apex angle α is set to an acute angle.

Next is an explanation of the operation of the optical switch provided with the first basic construction as above.

Here, the case is considered where for example as shown in FIG. 1, light input to the collimator positioned in the first row from the top and in the first column from the left in the input section 1A of the collimator array 1, is output via the collimator positioned in the second row from the top and in the second column from the right in the output section 1B of the collimator array 1. In the following explanation, the collimator positioned i rows from the top and j columns from the left in the input section 1A of the collimator array 1 is denoted as $1a_{i\text{-}j}$, and the collimator positioned i rows from the top and k columns from the right in the output section 1B of the collimator array 1 is denoted as $1b_{i\text{-}k}$. Also, for the input section 2A and the output section 2B of the tilt mirror array 2, as with the collimator array 1, the input tilt mirror is denoted as $2a_{i\text{-}j}$ and the output tilt mirror is denoted as $2b_{i\text{-}k}$.

In regard to the present optical switch, the light output from the input optical fiber array 10A passes through the input collimator $1a_{1\text{-}1}$ of the collimator array 1 and is incident on the input section 2A of the tilt mirror array 2, and is then reflected by the corresponding input tilt mirror $2a_{1\text{-}1}$ positioned in the input section 2A to be thereby changed its propagation direction, and is then sent to the shift type turn-back mirror 3. Then, the light which is incident on the shift type turn-back mirror 3, is reflected by the two reflective surfaces having the required apex angle α, so that the propagation direction is turned back while being shifted, and is then sent to the output tilt mirror $2b_{2\text{-}2}$ of the tilt mirror array 2. The swing angles of the reflecting surfaces of the tilt mirrors $2a_{1\text{-}1}$ and $2b_{2\text{-}2}$ are respectively controlled to angles corresponding to the positions of the input collimator $1a_{1\text{-}1}$ and the output collimator $1b_{2\text{-}2}$.

Here, the turn back operation of the light in the shift type turn-back mirror 3 will be specifically explained with reference to FIG. 3 and FIG. 4.

The incident light from the input section 2A of the tilt mirror array 2, is reflected by the input side reflective surface (the inclined surface positioned at the lower part in each figure) of the two reflective surfaces, to which the reflective coating R has been applied, and then propagated in the shift direction b2 to be sent to the output side reflective surface (the inclined surface positioned at the upper part in each figure). The light reflected by the output side reflective surface, is output from a different position to that where it has been incident on the shift type turn-back mirror 3, and is sent toward the output section 2B of the tilt mirror array 2. By using the shift type turn-back mirror 3 in this way, it is possible to turn back the incident light while shifting it. Particularly, as is shown in FIG. 3B and FIG. 4B, when the apex angle α subtended by the input side reflective surface and the output side reflective surface is set to approximately 90°, it is easy to design the optical system because the light beam is turned back in a parallel direction to the propagation direction of the incident light.

The light sent from the shift type turn-back mirror 3 to the tilt mirror array 2, is reflected by the output tilt mirror $2a_{2\text{-}2}$ so that the angle of the light beam is adjusted to the optical axis direction of the collimator array 1 and the output optical fiber array 10B, and is then incident onto the output optical fiber array 10B via the output collimator $1b_{2\text{-}2}$.

In this way, with the present optical switch, after the propagation direction of the light reflected by the input section 2A of the tilt mirror array 2 is shifted and turned back with the shift type turn-back mirror 3, the light is sent to the output section 2B of the tilt mirror array 2. Hence, even if integrated input/output type collimator array 1 and tilt mirror 2 are applied, it is possible to have a geometric construction equivalent the conventional case shown in FIG. 13 and FIG. 14 where the input section and the output section are provided separately.

Figure 5:
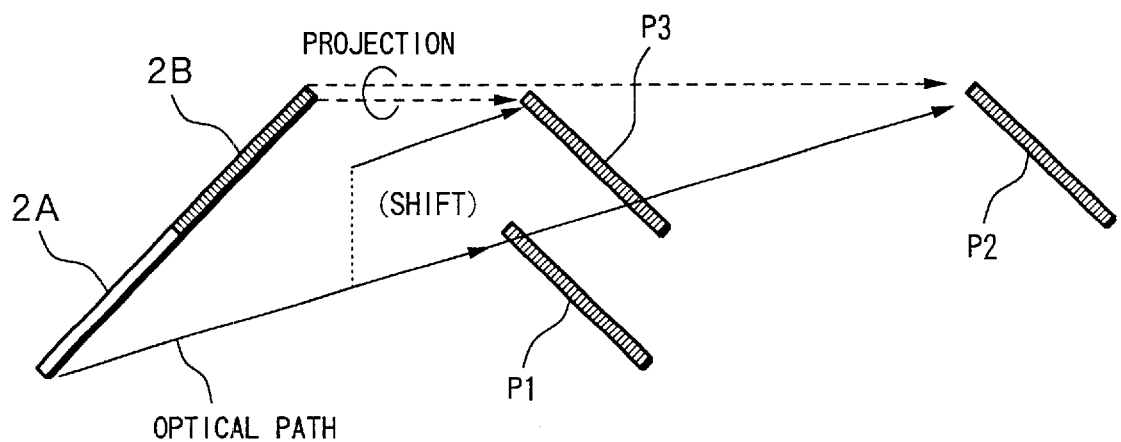
FIG. 5 is a conceptual diagram for explaining the geometric construction of the optical switch using tilt mirrors according to the present invention.
Figure 13:
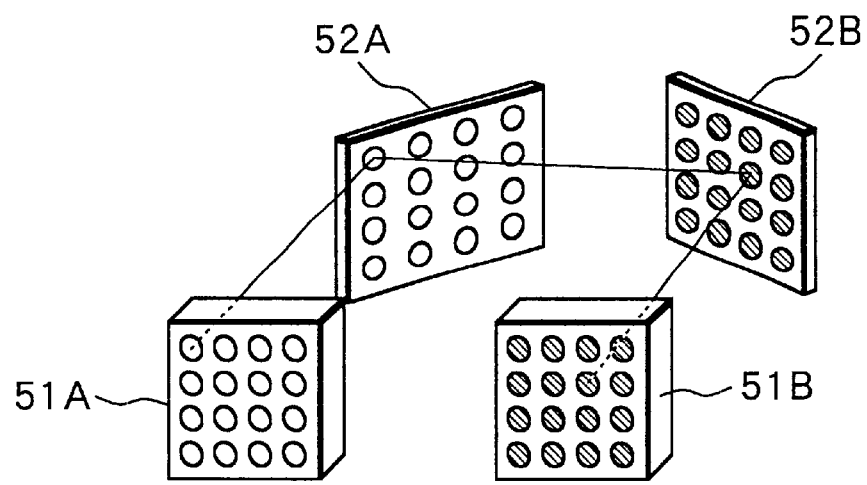
FIG. 13 is a perspective view showing a basic construction of a conventional optical switch using tilt mirrors.
Figure 14:
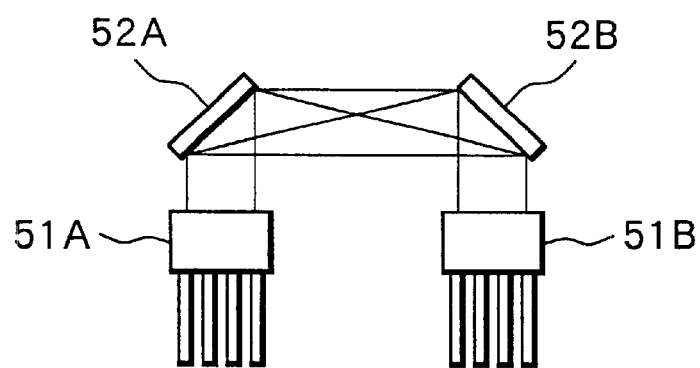
FIG. 14 is a plan view of the conventional optical switch of FIG. 13.
Figure 15:
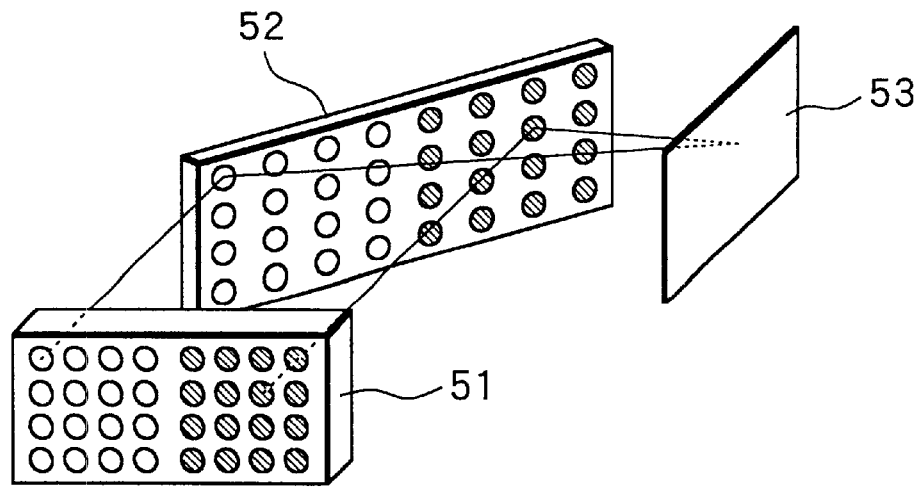
FIG. 15 is a perspective view showing a basic construction of a conventional turn-back type optical switch.
Figure 16:
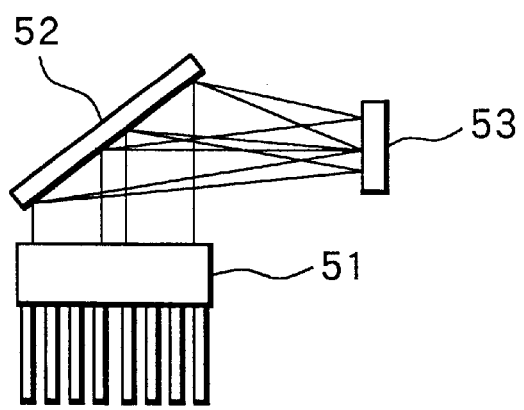
FIG. 16 is a plan view of the conventional turn-back type optical switch of FIG. 15.

That is to say, as shown in the conceptual diagram of FIG. 5, considering the position of the output section 2B with respect to the input section 2A in the tilt mirror array 2, in the case of the beforementioned construction shown in FIG. 13 and FIG. 14, the output section is arranged at a position of P1. Moreover, in the case of the beforementioned turn back construction shown in FIG. 15 and FIG. 16, the output section is arranged at a position corresponding to P2. In contrast to this, in the case of the construction according to the present invention shown in FIG. 1 and FIG. 2, the output section is arranged at a position corresponding to P3 equivalent to P1. Positions P2 and P3 of the output section 2B in the turn-back structure show the position where an actual output section is projected, with the position corresponding to the turn-back surface as a reference. In this way, by using the shift type turn-back mirror 3, it is possible to realize a construction where the input and output sections of the collimator array and those of the tilt mirror array are integrated, respectively, without increasing a spatial propagation distance of the light beam. As a result, it is possible to provide a small size optical switch with easy mounting for the optical components. Of course, since the number of optical components is reduced compared to the construction shown in FIG. 13 and FIG. 14, it is also possible to improve stability against disturbances such as temperature fluctuations and vibrations.

Next, is a description of a second basic construction of the optical switch using tilt mirrors of the present invention.

Figure 6:
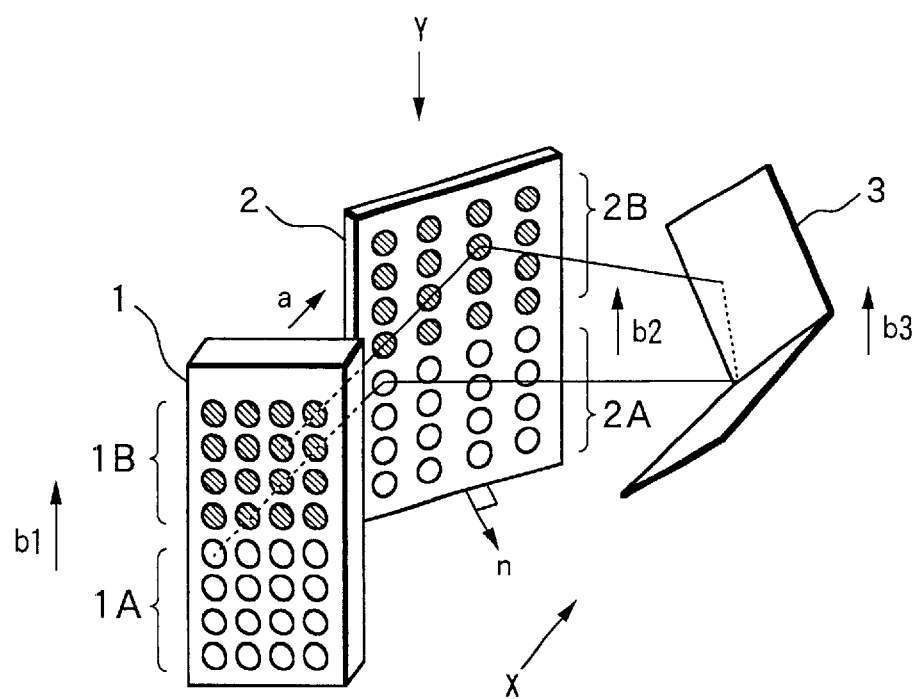
FIG. 6 is a perspective view of a second basic construction of the optical switch using tilt mirrors according to the present invention.
Figure 7:
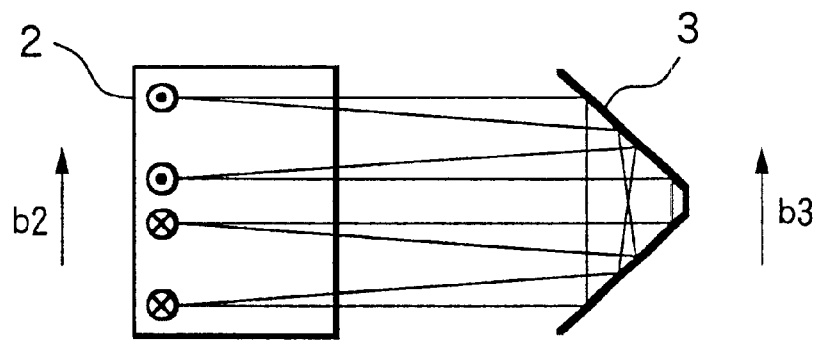
FIG. 7 is a plan view of a tilt mirror array and a shift type turn-back mirror of the optical switch of FIG. 6 viewed from the X direction.

FIG. 6 is a perspective view showing a second basic construction of the optical switch according to the present invention. Moreover, FIG. 7 is a plan view of the positions of the tilt mirror array 2 and shift type turn-back mirror 3 of FIG. 6 viewed from the X direction. Further, FIG. 8 is a plan view of the optical switch of FIG. 6 viewed from the Y direction.

Figure 8:
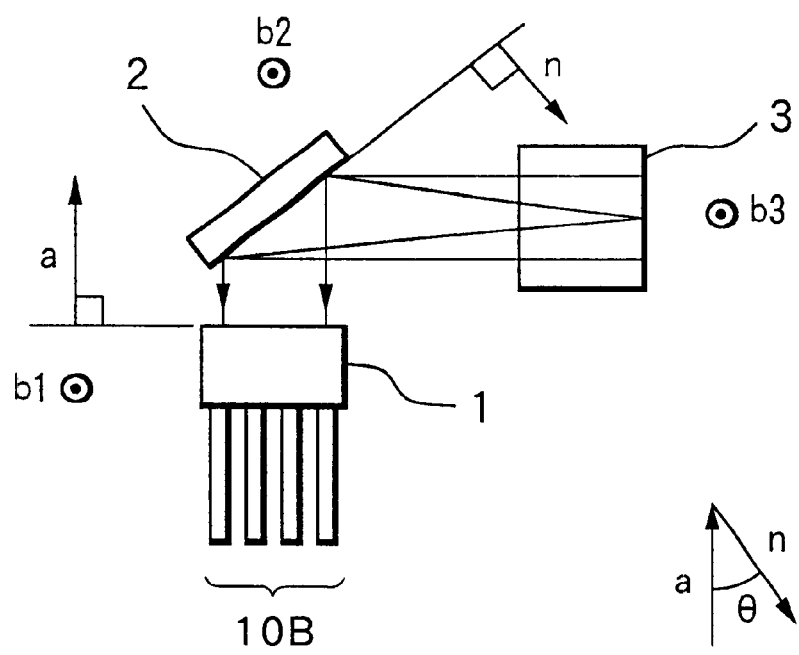
FIG. 8 is a plan view of the optical switch of FIG. 6 viewed from the Y direction.

In FIG. 6 through FIG. 8, the point where the second basic construction of this optical switch is different to the aforementioned first basic construction is that the position of the tilt mirror array 2 and the shift type turn-back mirror 3 with respect to the collimator array 1 is changed. The respective constructions of the collimator array 1, the tilt mirror array 2 and the shift type turn-back mirror 3 are similar to the case of the first basic construction.

Specifically, with regard to the tilt mirror array 2, a normal direction n of a plane on which the respective tilt mirrors are arranged, is arranged so as to be not parallel to a propagation direction a of the input light sent from the collimator array 1. Also, a direction b2 in which the input section 2A and the output section 2B are aligned is arranged so as to be perpendicular to an n-a plane (a plane containing the aforementioned normal direction n and the propagation direction a of the input light). Also a direction by in which the input section 1A and the output section 1B of the collimator array 1 are aligned, is arranged so as to be perpendicular to the n-a plane. Here also, it is preferable to set the angle θ (see lower right of FIG. 8) subtended by the normal direction n of the tilt mirror array 2 and the propagation direction a of the input light to approximately 45°. In this way, it is possible to minimize the distance between the input section 2A and the output section 2B with respect to the swing angles of the respective tilt mirrors. Also, the shift type turn-back mirror 3 is positioned so that the shift direction b3 of the light beam is perpendicular to the n-a plane.

In the optical switch provided with the above-described second construction, the spatial propagation distance of the light beam can be even shorter than for the case of the first basic construction. That is to say, for the first basic construction, it is necessary to incline the tilt mirror 2 in the direction b2 in which the input section 2A and the output section 2B are aligned, because the direction in which the tilt mirror array 2 is inclined with respect to the collimator array 1, and the shift direction of the light beam in the shift type turn-back mirror 3 are in the same plane (see FIG. 2). Regarding the construction example of FIG. 1 and FIG. 2, the output section 2B of the tilt mirror array 2 is inclined with respect to the collimator array 1 so as to be positioned further away than the input section 2A. Thus, the larger the incline of the tilt mirror array 2, the longer the distance from the output section 2B of the tilt mirror array 2 to the output section of collimator array 1. Hence, the spatial propagation distance of the light inside the switch also increases. In contrast to this, in the second basic construction, because the incline direction of the tilt mirror array 2 with respect to the collimator array 1 and the shift direction b3 of the light beam in the shift type turn-back mirror 3 are perpendicular to each other (see FIG. 8), the tilt mirror array 2 may be inclined in a direction perpendicular to the direction b2. Consequently, even if the incline of the tilt mirror array 2 becomes large, the distance between the collimator array 1 and the tilt mirror array 2 hardly changes. Hence, it is possible to make the spatial propagation distance of the light inside the optical switch extremely short.

Figure 9A:
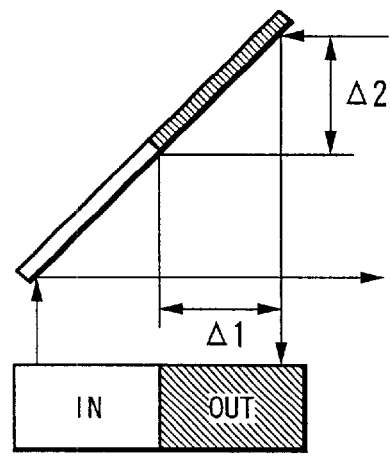
FIGS. 9A and 9B are schematic diagrams comparing spatial propagation distances for the first basic construction and the second basic construction of the optical switch using tilt mirrors according to the present invention.
Figure 9B:
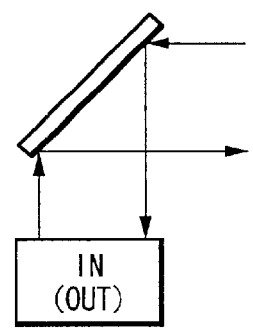

FIG. 9 schematically shows the above described content, with FIG. 9A corresponding to the first basic construction, and FIG. 9B corresponding to the second basic construction. As shown in FIG. 9, with the second basic construction, it can be seen that the spatial propagation distance compared to that of the first basic construction is reduced by $\Delta 1 + \Delta 2$.

Next, is a description of a specific embodiment of the optical switch to which the above described first and second basic constructions are applied.

Figure 10:
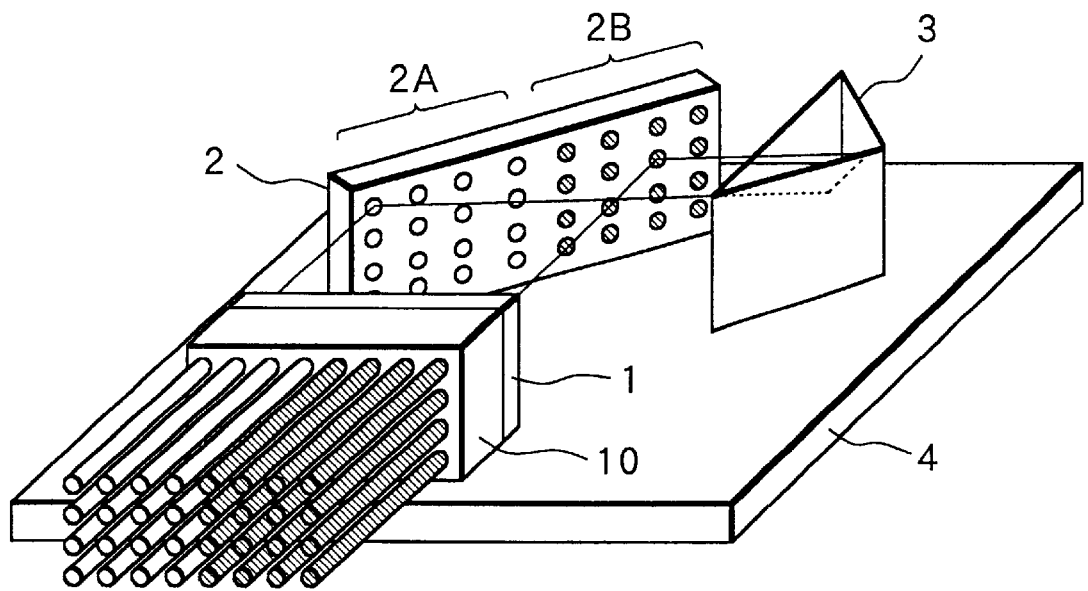
FIG. 10 is a perspective view showing a construction example of an embodiment of the optical switch applied with the first basic construction of the present invention.

FIG. 10 is a perspective view showing a construction example of the embodiment according to the optical switch to which the first basic construction is applied.

In the construction example of FIG. 10, a collimator array 1 with integrated input and output sections, a tilt mirror array 2 and a shift type turn-back mirror 3, are all mounted on the same plane of a case 4. Further, an optical fiber array 10 with a plurality of integrally formed input optical fibers and output optical fibers, is attached to the collimator array 1. The optical switch of such a construction can be applied to optical cross-connection of 16 channels.

Figure 11:
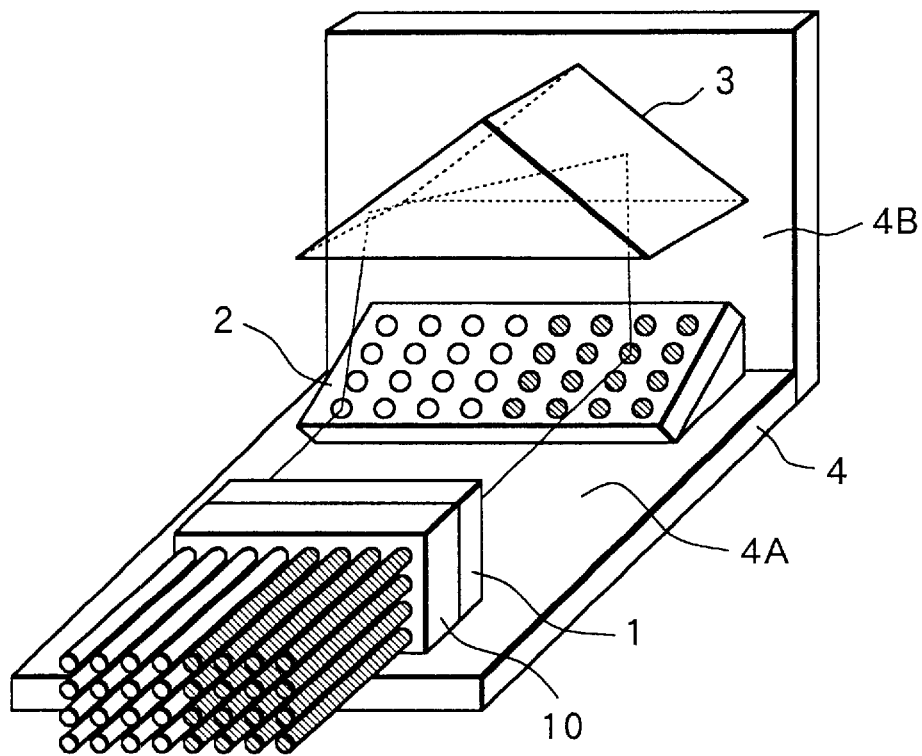
FIG. 11 is a perspective view showing a construction example of an embodiment of the optical switch applied with the second basic construction of the present invention.

FIG. 11 is a perspective view showing a construction example of the embodiment according to the optical switch to which the second basic construction is applied.

In the construction example of FIG. 11, a collimator array 1 with integrated input and output sections, and a tilt mirror array 2 are mounted on a first plane 4A of a case 4. Moreover, a shift type turn-back mirror 3 is mounted on a second plane 4B that is perpendicular to the first plane 4A of the case 4. Further, an optical fiber array 10 is attached to the collimator array 1.

Figure 12:
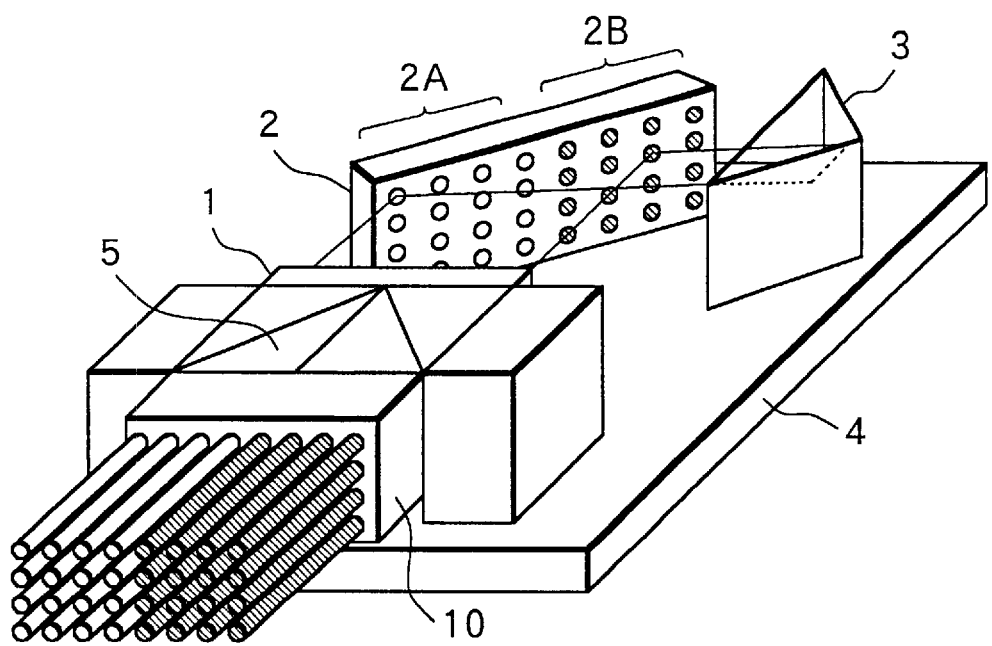
FIG. 12 is a perspective view showing an application example of the optical switch shown in FIG. 10.

FIG. 12 is a perspective view showing an application example of the aforementioned optical switch shown in FIG. 10.

With regard to the application example of FIG. 12, a monitor system 5 for monitoring light input and output to and from the optical fiber array 10 is positioned between the collimator array 1 and the optical fiber array 10. The monitor system 5 is used for controlling or monitoring whether or not the switching of the optical path in this optical switch is being performed normally, by branching a part of the light sent from the output section 1B of collimator array 1 to the output optical fiber and measuring the power or the like of the branched light. Here, the monitor system 5 is positioned between the collimator array 1 and the optical fiber array 10. However, the positioning of the monitor system 5 is not limited to the above, and may be positioned, for example, between the collimator array 1 and the tilt mirror array 2.

What is claimed:

1. An optical switch using tilt mirrors comprising;
a collimator array formed with an input section arranged with a plurality of input collimators and an output section arranged with a plurality of output collimators, said input section and said output section being aligned within the same plane;
a tilt mirror array formed with an input section arranged with a plurality of input tilt mirrors each of which has a reflection surface with an angle thereof being controllable and an output section arranged with a plurality of output tilt mirrors each of which has a reflection surface with an angle thereof being controllable, said input section and said output section being aligned within the same plane; and
a shift type turn-back mirror for shifting an optical path of incident light in a predetermined direction and turning back and outputting this light,
wherein the light output from the respective input collimators of said collimator array, is reflected by the corresponding input tilt mirrors of said tilt mirror array so that the optical path is changed, and is then sent to said shift type turn-back mirror, and the light which has been shifted and turned back by said shift type turn-back mirror is reflected by the corresponding output tilt mirrors of said tilt mirror array and then respectively output from the respective output collimators of said collimator array.

2. An optical switch using tilt mirrors according to claim 1,
wherein said tilt mirror array is arranged so that a normal direction of a plane on which the respective reflection surfaces of said input tilt mirrors and said output tilt mirrors are arranged, and a propagation direction of the light output from the input section of said collimator array are not parallel.

3. An optical switch using tilt mirrors according to claim 2,
wherein said tilt mirror array is arranged so that an angle subtended by the normal direction and the propagation direction of the light from said collimator array is approximately 45°.

4. An optical switch using tilt mirrors according to claim 2,
wherein said collimator array is arranged such that a direction in which the input section and the output section thereof are aligned, is made parallel with respect to a reference plane which contains the normal direction for the tilt mirror array and the propagation direction of the light output from the input section of said collimator array,
said tilt mirror array is arranged such that a direction in the input section and the output section thereof are aligned, is made parallel with respect to said reference plane, and
said shift type turn-back mirror is arranged such that a shift direction of the optical path is made parallel with respect to said reference plane.

5. An optical switch using tilt mirrors according to claim 2,
wherein said collimator array is arranged such that a direction in which the input section and the output section thereof are aligned, is made perpendicular with respect to a reference plane which contains the normal direction for the tilt mirror array and the propagation direction of the light output from the input section of said collimator array,
said tilt mirror array is arranged such that a direction in the input section and the output section thereof are aligned, is made perpendicular with respect to said reference plane, and
said shift type turn-back mirror is arranged such that a shift direction of the optical path is made perpendicular with respect to said reference plane.

6. An optical switch using tilt mirrors according to claim 1,
wherein said respective input tilt mirrors and said respective output tilt mirrors are micro tilt mirrors made applying micro machining technology.

7. An optical switch using tilt mirrors according to claim 1,
wherein said shift type turn-back mirror includes; a first reflecting surface for reflecting light from the input section of said tilt mirror array to shift the optical path, and a second reflecting surface for reflecting the light from said first reflecting surface to turn this back to the output section of said tilt mirror array.

8. An optical switch using tilt mirrors according to claim 7,
wherein an angle subtended by said first reflecting surface and said second reflecting surface said shift type turn-back mirror is set to approximately 90°.

9. An optical switch using tilt mirrors according to claim 7,
wherein said shift type turn-back mirror uses a triangular prism with two surfaces excluding a light incident surface as mirrors.

10. An optical switch using tilt mirrors according to claim 7,
wherein said shift type turn-back mirror uses a mirror of a V-shaped construction with two inclined surfaces as reflecting surfaces.

11. An optical switch using tilt mirrors according to claim 1,
wherein there is provided a monitor system for monitoring the propagation condition of light inside said switch.

* * * * *